United States Patent [19]

Netzer

[11] 4,451,991

[45] Jun. 5, 1984

[54] VERTICAL INDICATING METHOD AND DEVICE

[76] Inventor: Yishav Netzer, 5 Kenmar Dr. #18, Billerica, Mass. 01821

[21] Appl. No.: 275,602

[22] Filed: Jun. 22, 1981

[51] Int. Cl.³ .............................................. G01C 9/08
[52] U.S. Cl. ...................................... 33/396; 33/346; 33/391
[58] Field of Search ................ 33/396, 397, 391, 395, 33/346, 398, 402; 73/382 R, 521, 522, 10

[56] References Cited

U.S. PATENT DOCUMENTS

| 689,323 | 12/1901 | Quimby | 33/396 |
|---|---|---|---|
| 2,924,022 | 2/1960 | Callahan | 33/346 |
| 3,520,065 | 7/1970 | Pace | 33/391 |
| 3,945,128 | 3/1976 | Weiss | 33/366 |
| 3,975,831 | 8/1976 | Jysky et al. | 33/397 |
| 4,096,638 | 1/1978 | Schimming | 33/396 |
| 4,163,325 | 8/1979 | Hughes | 33/346 |

Primary Examiner—Willis Little
Attorney, Agent, or Firm—Lackenbach, Siegel, Marzullo, Presta & Aronson

[57] ABSTRACT

A vertical indicating device is comprised of a compound pendulum immersed in a liquid and one or more paddles attached to the pendulum to couple its motion to the liquid. The effective length of the equivalent pendulum is much longer than the physical dimension of the device. The loading on the bearing is minimal, thus, achieving low friction and high accuracy.

12 Claims, 1 Drawing Figure

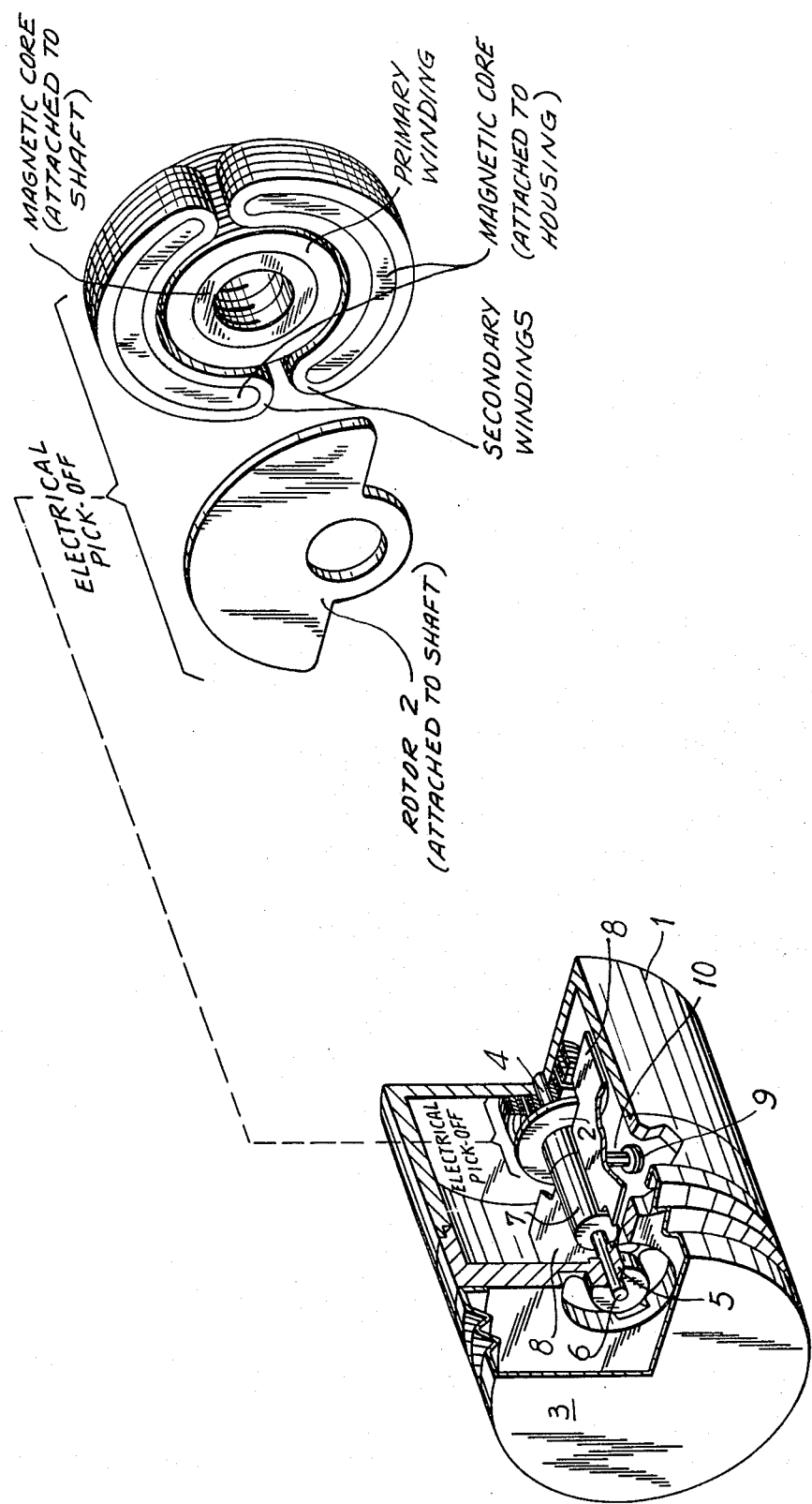

VERTICAL INDICATING METHOD AND DEVICE

BACKGROUND OF THE INVENTION

This invention describes a method and apparatus for indicating the vertical. More particularly it relates to a pendulous type of vertical indicator.

Vertical indicating devices are needed in various situations, particularly in military fire-control system applications and navigation and guidance applications. Pendulous vertical indicators actually determine the direction of total acceleration—which aligns with the vertical. In the presence of lateral accelerations or shocks due to motion of the vehicle in which the pendulum is mounted, the direction indicated by the pendulum is erroneous because the pendulum actually responds to the vector sum of gravity acceleration -g and the lateral accelerations, and, thus may read accurately only under static conditions.

Pendulums may be classified as either mathematical or compound. The mathematical pendulum is characterized by a mass concentrated at a single point at distance, l, from the pivot axis. This pendulum exists only as an idealized model and its calculated natural period is given by $1/2\pi g$. Real-life or compound pendulums, on the other hand, have a mass which is distributed along its body. As is well known to those skilled in the art, the compound pendulum has an equivalent or effective length, l, which is related to the distance, l', of its center-of-mass from the pivot axis, and its moment of inertia I around this axis. This length is given by $I/ml'$., where m is the total mass of the pendulum.

DESCRIPTION OF PRIOR ART

The compound pendulum and the idealized mathematical pendulum, as well, have the disadvantage that when constructed to a practical length, the natural period is relatively short and the period's reciprocal—the natural frequency—is relatively high. The importance of a low natural frequency is that for lateral vibrations at frequencies above the natural frequency the pendulum is relatively unaffected. The angular reading error is, then, essentially x/l, where x is the amplitude of vibrations anbd l is the effective length of the pendulum. Thus, it is seen that increasing l both increases the frequency range of satisfactory operation and decreases the amplitude of the error.

Prior art pendulous-vertical-indicators have used several methods in order to overcome the problems of a compound pendulum which is inherently limited in physical length. By far, the most accurate and expensive method is to realize an effective length which is equal to the radius of the earth. This kind of pendulum is often called a Schuler-tuned pendulum and the large effective length is realized by various methods involving linear accelerometers, angular accelerometers or gyroscopes. It can be shown that a Schuler-tuned pendulum indicates the true vertical regardless of motions of the vehicle in which it is mounted. A typical mechanization of a Schuler-tuned pendulum is described in U.S. Pat. No. 3,015,962. However, this kind of pendulum is expensive, complicated, cumbersome and is appropriate only for very demanding applications, mainly in inertial navigation systems.

For less demanding applications, a pendulum and gyroscope combination is often used. The gyroscope is slaved to the long term, or averaged, orientation of the pendulum and maintains this orientation against vehicle movements. This type of augmented pendulum is called a Vertical - Gyro and is used in applications such as airborne automatic pilots. For still less demanding applications, bare compound pendulums have been used with performance limited by the relatively high natural frequency, or enhanced by various attachments to the pendulum, such as described in U.S. Pat. No. 3,945,128 and U.S. Pat. No. 4,163,325.

SUMMARY OF THE INVENTION

It is, therefore, one subject of this invention to provide a pendulous vertical indicating sensor which is compact, low in cost and still attains a very long equivalent length with a resulting low natural frequency.

A second object of the present invention is to provide a pendulum with a very high immunity to shock and vibration.

A third object of the invention is to provide a pendulum with very low loading in the bearings. This results in a high accuracy virtually limited by the quality of the angular pick-off which translates the angular deviation of the pendulum into an output voltage.

A fourth object of the invention is to provide a pendulum which gives the instantaneous reading of the output angle over an angular range of 360°.

GENERAL DESCRIPTION OF THE INVENTION

The subject of this invention is a passive compound pendulum which achieves a very long effective length in a relatively compact mechanical envelope. As previously described, the effective length of a compound pendulum is directly proportional to its moment of inertia and inversely proportional to the product of its mass and the distance between pivot axis and the center of mass—hereinafter referred to as pendulosity. For a given set of envelope dimensions and coefficient of friction in the bearings, it is obvious that increasing the effective length of a pendulum by increasing the inertia means more mass and results in more loading on the bearings with resultant increased friction. On the other hand, for a given inertia and bearing friction, the effective length can be increased by decreasing the pendulosity. The restoring torque is, thus, decreased in comparison with the frictional torque in the bearings which again impairs the accuracy of the reading.

The present invention circumvents the above difficulties by having most of the pendulum's inertia provided by a liquid rotor rather than by a solid pendulous element. The liquid mass does not load the bearings and the effective load on the bearings is due only to a light solid pendulous rotor element. The solid rotor is coupled to the liquid to enhance its moment of inertia and its angular position is read by a pick-off. The result is a long effective length and small friction errors. Furthermore, by neutrally floating the rotor in the same liquid, the residual loading on the bearings can be virtually eliminated, with the result that the pendulosity can be further reduced to achieve still longer effective length.

To more fully describe the invention, reference is made to the accompanying drawing which shows a cut away view of the sensor.

DESCRIPTION OF THE PREFERRED EMBODIMENT

As shown in the drawing, the preferred embodiment of the invention comprises a housing of cylindrical shape, 1, containing a liquid in which the pendulum rotor, 2, is immersed. The housing also includes a bellows, 3, which accommodates temperature induced changes in the volume of the liquid. The rotor, 2, is comprised of a shaft, 4, made of the same material as the housing, aluminum, in this case. At the ends of the rotor shaft there are hard conical pivots, 5, made, for example, from Tungsten Carbide. The clearance between the pivots and the mating jewels, 6, is maintained against temperature variations by virtue of the equal coefficient of thermal expansion of the housing and the shaft, this clearance is typically 2-3 mils. The cylindrial shaft is surrounded by a plastic tube, 7, which supports two thin fiberglass paddles, 8. The density and volume of the tube provide neutral buoyancy to the rotor assembly and relieve any loading on the bearings to minimize the friction. Neutral buoyancy is not necessary to the operation of the preferred embodiment but is desirable, when very high accuracy or when immunity to extreme shock and vibration are desired. The two paddles attached to the rotor assembly are used to couple the motion of the rotor to the liquid and, thus, increase its moment of inertia. The liquid has, preferably, a high density and low viscosity. Fluro-Carbon type FC-104 manufactured by the 3M Company—which has a density of about 2 $gm/cm^3$ and a viscosity of 0.8 centistoke—is a liquid of the desired type. The high density is desirable for increased inertia while the low viscosity is desirable for reducing rotational motion in the pendulum caused by viscous coupling to the case. However, low viscosity may result in excessively small damping of motions induced in the rotor due to lateral accelerations acting on the housing. Thus, the selection of the actual fluid viscosity should depend on the specific use of the ivention. The pendulosity of the rotor is adjustable by means of a small bob, 9, mounted on a threaded shaft, 10, and is used to adjust the effective length of the pendulum. The angular position of the rotor relative to the housing may be read by means of a pick-off (not shown), which is preferably of a non-contact type. In the preferred embodiment the pick off is a Rotary-Variable-Differential-Transformer (RVDT).

During operation the bob is attracted by gravity to align with the vertical direction. The total moment of inertia is determined mostly by the liquid's inertia and opposes motion of the rotor due to short term cross accelerations. This is equivalent to saying that the effective length of the pendulum is increased as described above. It is seen that for a given pendulosity the effective length is dependent on the liquid's inertia which by itself is dependent on the housing radius R, or more accurately, proportional to $R^4$. For illustration, in a model in which $R=12$ mm an effective length of 12 m is easily achievable using the above mentioned liquid. The effect of friction in this model showed repeatability at $\frac{1}{2}°$, which could be further improved by neutrally floating the rotor, as already described.

A simple, low cost and compact pendulous vertical sensor has been described. It features a high ratio of effective length to mechanical dimensions and high performance which is achieved by means of a liquid mass coupled to a pendulous element, where the small bearing loading can be further decreased by neutrally floating the pendulous element. Obviously, many modifications and variations of the present invention are possible in the light of the above description, such as the use of different types of materials, bearings, liquid coupling means and so on. Another modification would be the two-axes counterpart of the invention as described, in which the pendulous element is free to swing in two mutually perpendicular axes and provided with a suitable angular pick-off means so as to indicate the housing tilt in two axes. It is, therefore, understood that within the scope of the disclosed inventive concept, the invention may be practiced otherwise than specifically described.

I claim:

1. A generally small compact pendulous verticality sensor of the type having pendulous element means pivoted about at least one axis, comprising: a housing containing a rotor assembly including said pivoted pendulous element means immersed in a liquid having a relatively low viscosity; said pendulous element means further including a shaft supported by bearing means at its opposite ends, and said shaft having generally flat, outwardly extending vane-like coupling means coupling said pendulous element means to said liquid, said coupling means being for substantially increasing the moment of inertia of said shaft without increasing the loading on said bearing means,
   adjustable bob means for aligning said pendulous element with the vertical and for adjusting the effective length of said pendulous element means and the pendularity of said rotor assembly,
   and said sensor further including angular electrical pick-off means on said shaft for providing an electrical signal proprtional to the angular tilt of said rotor assembly relative to said housing.

2. The pendulous verticality sensor according to claim 1, wherein said shaft is cylindrical and surrounded by a tube supporting said coupling means.

3. A pendulous verticality sensor according to claim 2, wherein said coupling means comprises a pair of oppositely diposed paddles.

4. The pendulous verticality sensor according to claim 2, wherein the density and volume of said tube provides neutral buoyancy to said rotor assembly and relieves any loading on said bearing means, thus minimizing friction in said bearing means and increasing the accuracy of said signal.

5. The pendulous verticality sensor according to claim 7, including wherein said adjustable bob means includes a threaded shaft connected to said shaft of said pendulous element and a small bob adjustably mounted on said threaded shaft.

6. The pendulous verticality sensor according to claim 3, wherein said tube and said paddles are made of a relatively light material, such as plastic.

7. The pendulous verticality sensor according to claim 1, wherein said housing includes a bellows so as to accommodate temperature induced changes in the volume of said liquid.

8. The pendulous verticality sensor according to claim 1, wherein the angular measurement of said pick-off means extends a full 360°.

9. The pendulous verticality sensor according to claim 1, wherein said pendulous element means is pivotable about two mutually perpendicular axes, and said sensor includes an additional angular electrical pick-off means providing another electrical signal proportional to the tilt of said housing in the direction of the second axis.

10. The pendulous verticality sensor according to claim 1, wherein said rotor assembly and shaft are made of the same material for maintaining clearance at the bearing means due to any temperature variations.

11. The pendulous verticality sensor according to claim 1, wherein said liquid also has a high density for increased inertia.

12. The pendulous verticality sensor according to claim 1, wherein said shaft and rotor assembly of said pendulous element means are solid and made of aluminum.

* * * * *